United States Patent
Oh et al.

(10) Patent No.: US 7,983,147 B2
(45) Date of Patent: Jul. 19, 2011

(54) METHOD OF SETTING AND CHANGING RECEIVE CHANNEL SET OF CABLE MODEM

(75) Inventors: Hye Ju Oh, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 307 days.

(21) Appl. No.: 12/182,206

(22) Filed: Jul. 30, 2008

(65) Prior Publication Data

US 2009/0150953 A1    Jun. 11, 2009

(30) Foreign Application Priority Data

Dec. 10, 2007  (KR) .................. 10-2007-0127451

(51) Int. Cl.
    *G01R 31/08*     (2006.01)
    *G06F 11/00*     (2006.01)
    *H04J 1/16*     (2006.01)
    *H04J 3/02*     (2006.01)
    *H04L 12/28*     (2006.01)
    *H04N 7/173*     (2011.01)
    *H04B 1/38*     (2006.01)

(52) U.S. Cl. ........ 370/216; 370/254; 370/431; 370/462; 725/111; 725/114; 375/222

(58) Field of Classification Search .................. 725/105, 725/111–115; 370/252, 254, 431–433, 437, 370/458–463, 216; 375/222
See application file for complete search history.

(56) References Cited

U.S. PATENT DOCUMENTS

| | | | |
|---|---|---|---|
| 6,023,462 A * | 2/2000 | Nieczyporowicz et al. | 370/335 |
| 6,742,187 B1 | 5/2004 | Vogel | |
| 6,986,157 B1 * | 1/2006 | Fijolek et al. | 725/111 |
| 7,389,527 B2 * | 6/2008 | Bunn et al. | 725/111 |
| 2002/0144284 A1 * | 10/2002 | Burroughs et al. | 725/111 |
| 2003/0035442 A1 * | 2/2003 | Eng | 370/486 |
| 2005/0025145 A1 * | 2/2005 | Rakib et al. | 370/389 |
| 2007/0202882 A1 * | 8/2007 | Ju et al. | 455/450 |
| 2008/0273548 A1 * | 11/2008 | Leano et al. | 370/442 |

FOREIGN PATENT DOCUMENTS

| | | |
|---|---|---|
| KR | 1020000055845 A | 9/2000 |
| KR | 10-0590873 B1 | 6/2006 |

OTHER PUBLICATIONS

DOCSIS 3.0, MAC and Upper Layer Protocols Interface Specification, CM-SP-MULPIv3.0-I05-070803, Aug. 3, 2007, Cable Television Labratories, pp. 20, 144-145, 259-269, 412, 536.*

* cited by examiner

*Primary Examiner* — Alpus H Hsu
*Assistant Examiner* — Jeremy Costin
(74) *Attorney, Agent, or Firm* — Ladas & Parry LLP

(57) ABSTRACT

A method of effectively setting and changing a Receive Channel Set (RCS) of a cable modem (CM) is provided. The method includes: receiving, by a Cable Modem Termination System (CMTS), a Receive Channel Profile (RCP) with respect to a downstream physical layer of a CM; composing, by the CMTS, a plurality of channel configuration information required for setting the RCS of the CM with reference to the RCP; encoding, by the CMTS, the plurality of channel configuration information, and transmitting the encoded plurality of channel configuration information to the CM; transmitting, by the CM, an RCP with respect to a downstream physical layer to a CMTS; receiving, by the CM, a plurality of channel configuration information being composed with reference to the RCP and being required for setting the RCS; and setting, by the CM, the RCS using the plurality of channel configuration information.

9 Claims, 8 Drawing Sheets

FIG. 4

| TYPE | LENGTH | VALUE |
|---|---|---|
| 4 | 9 | Sub-TLV |
| 4.1 | 1 | RCP Center Frequency Spacing<br><br>0 = 6MHz center frequency spacing<br><br>1 = 8MHz center frequency spacing<br><br>2-255 : Reserved |
| 4.2 | 1 | Verbose RCP Reporting<br><br>0 = Not provide verbose RCP report<br><br>1 = Provide verbose RCP report<br><br>2-255 : Reserved |
| 4.3 | 1 | Available multiple RCP-ID assign<br><br>0 = Multiple RCP-ID assign OFF<br><br>1 = Multiple RCP-ID assign ON<br><br>2-255 : Reserved |

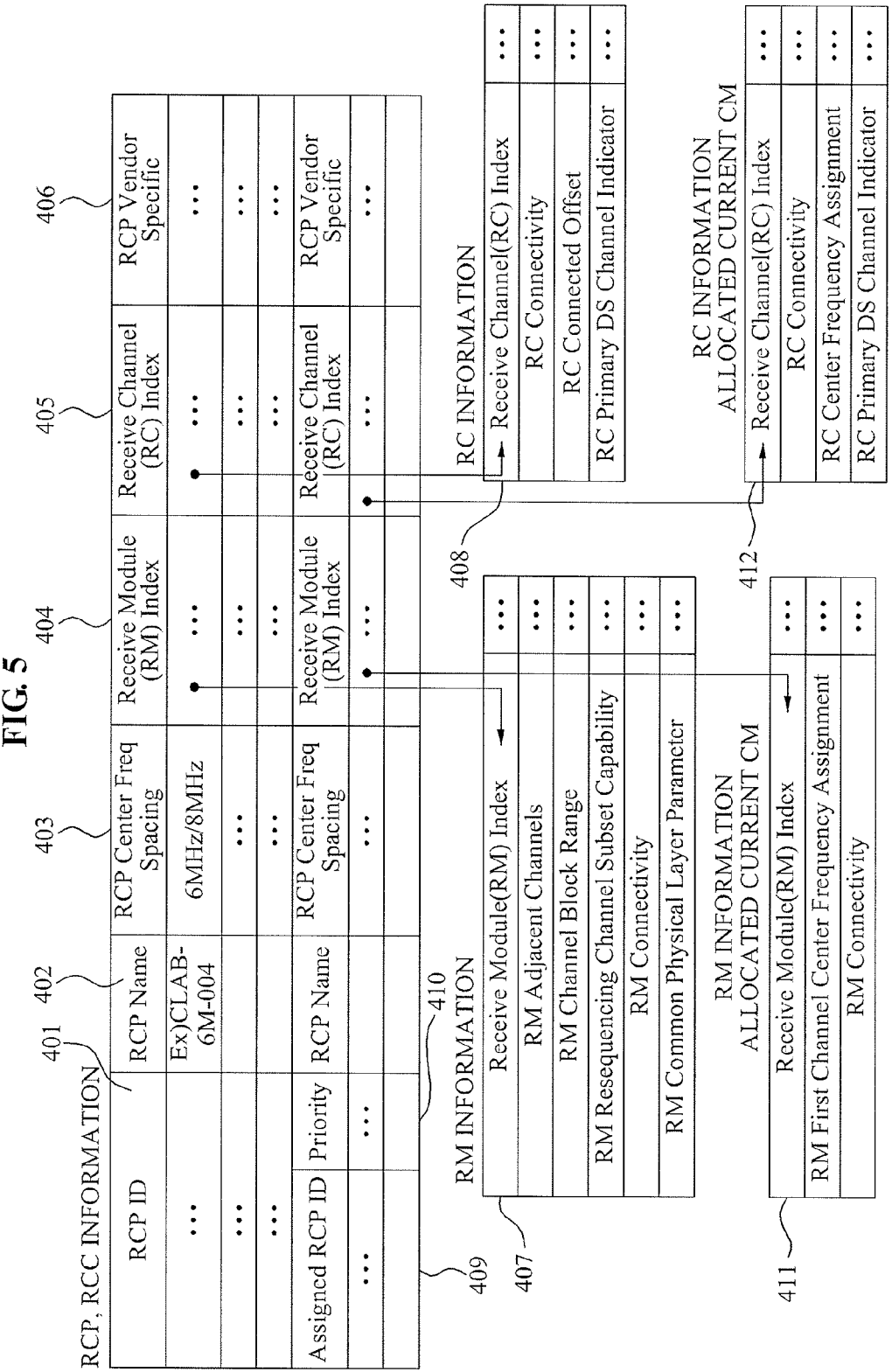

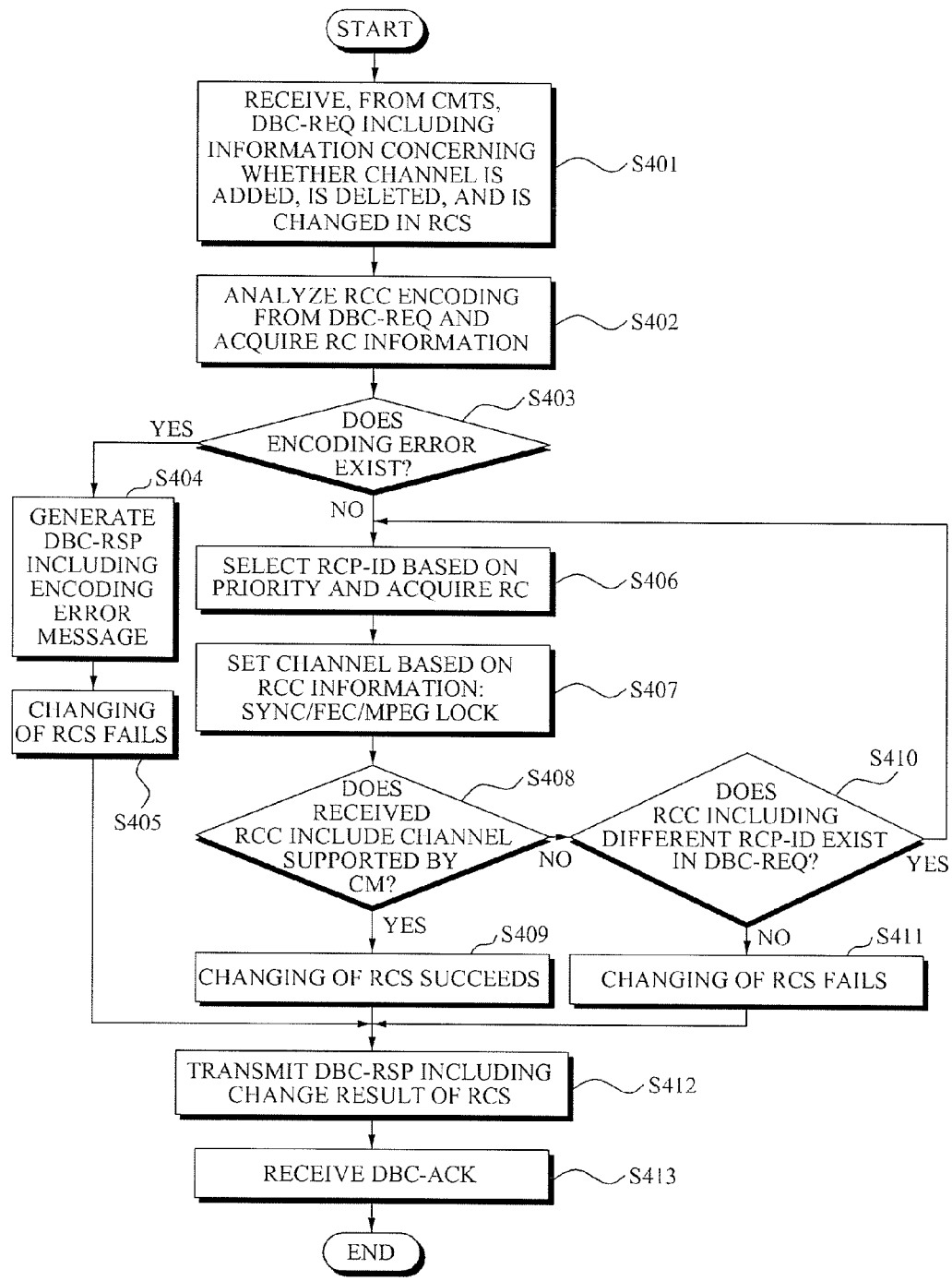

METHOD OF SETTING AND CHANGING RECEIVE CHANNEL SET OF CABLE MODEM

CROSS-REFERENCE TO RELATED APPLICATION

This application claims priority from Korean Patent Application No. 10-2007-0127451, filed on Dec. 10, 2007, in the Korean Intellectual Property Office, the entire disclosure of which is incorporated herein by reference.

BACKGROUND OF THE INVENTION

1. Field of the Invention

The present invention relates to a method of setting and changing a Receive Channel Set (RCS) of a cable modem (CM), and more particularly, to a method of effectively setting and changing an RCS of a CM.

This work was supported by the IT R&D program of MIC/IITA [2006-S-019-02, The Development of Digital Cable Transmission and Receive System for 1 Gbps Downstream].

2. Description of Related Art

FIG. 1 illustrates a connection structure of a Cable Modem Termination System (CMTS) 101 and cable modems (CMs) 102 to transmit data using a plurality of transmitting/receiving channels according to a conventional art.

Referring to FIG. 1, the CMTS 101 and the CMs 102 to transmit/receive the data are connected with a cable network.

The CMTS 101 is an apparatus for connecting an Internet Protocol (IP) network with the cable network, converts the data received using the IP network into a cable signal, provides the cable signal for the CMs 102, converts the data received from the CMs 102 using the cable network into an IP packet, and transmits the IP packet to the IP network. The CMTS 101 may transmit/receive the data using a plurality of channels simultaneous with the specific CMs 102. Here, available downstream channels need to be reported to the CMTS 101, and the CMTS 101 needs to determine appropriate load distribution and channel bonding service support.

The CMs 102 are apparatuses for providing the Internet and high-speed data communication using the cable network.

The CMs 102 need to recognize which channel set is used for a service from the CMTS 101 in order to transmit/receive the data from/to the CMTS 101.

Hereinafter, a process of setting a Receive Channel Set (RCS) is described. The CMTS 101 receives, from the CMs 102, a registration request message (REG-REQ-MP) including a plurality of Receive Channel Profiles (RCPs). Each RCP logically expresses channel information about a downstream physical layer of the CMs 102, and is shown as a form of a Receive Channel (RC) and a Receive Module (RM).

The CMTS 101 transmits, to the CMs 102, a registration response message (REG-RSP-MP) of encoding a single Receive Channel Configuration (RCC) with reference to an RCP.

The CMTS 101 transmits the registration response message (REG-RSP-MP) to the CMs 102, thereby reporting initialization channel setting of the CMs 102.

In an initial setting, the CMs 102 transmit, to the CMTS 101, the registration request message (REG-REQ-MP) including the plurality of RCPs for first RC acquisition.

The CMs 102 subsequently receive the RCC from the CMTS 101, set downstream receiving apparatuses of the CMs 102 to a corresponding frequency using an RCP-Identification (ID) allocated by the CMTS 101, that is, the specific RCP, acquire a synchronization (SYNC) message, and sequentially acquire downstream channels via a Forward Error Correction (FEC) frame synchronization and Motion Picture Experts Group (MPEG) synchronization process. The CMs 102 subsequently transmit, to the CMTS 101, a registration acknowledgment message (REG-ACK) including a setting result of the RCS.

After registration is completed by the initial setting of the CMs 102, the CMTS 101 may change the RCC of the CMs 102 at any time, thereby adding a channel to the RCS of the CMs 102, or deleting the channel from the RCS, or changing the channel in the RCS.

Specifically, the CMTS 101 transmits, to the CMs 102, a dynamic bonding change request message (DBC-REQ) of a new single RCC.

The CMTS 101 subsequently receives, from the CMs 102, a dynamic bonding change response message (DBC-RSP) including a change result of the RCS, and completes changing the RCS.

The CMs 102 receive the dynamic bonding change request message (DBC-REQ) of the new RCC from the CMTS 101.

The CMs 102 subsequently change the downstream channels again using the received message, and transmit, to the CMTS 101, a dynamic bonding change response message (DBC-RSP) including the change result.

An error may occur during the above-described process of setting and changing the RCS. For example, a CMTS may allocate an RCC not being supported by a CM, or because a channel receive state is unfavorable, the RCC may not be temporarily received even when the RCC is reported as being supported by the CM. Since a plurality of downstream channels is sequentially acquired, a significant delay may occur when a channel setting error occurs once. Also, since the CMTS and the CM transmit/receive the single RCC, the setting and changing of the RCS is difficult when the error with respect to the channel occurs.

Accordingly, a method of effectively setting and changing of the RCS even in an error situation is required.

SUMMARY OF THE INVENTION

An aspect of the present invention provides a method of setting and changing a Receive Channel Set (RCS) of a cable modem (CM) which enables a Cable Modem Termination System (CMTS) in a cable network using a channel bonding scheme to systematically reconstruct and manage a Receive Channel Profile (RCP) of the CM, to encode a plurality of RCS configuration information based on a priority when setting and changing the RCS, and to transmit the encoded plurality of RCS configuration information to the CM, thereby effectively setting and changing the RCS even when an error occurs during a process of setting and changing the RCS of the CM.

The present invention is not limited to the above-described purposes and other purposes not described herein will be apparent to those of skill in the art from the following description.

According to an aspect of the present invention, there is provided a method of setting an RCS of a CMTS in a cable network, the method including: receiving an RCP with respect to a downstream physical layer of a CM; composing a plurality of channel configuration information required for setting the RCS of the CM with reference to the RCP; and encoding the plurality of channel configuration information, and transmitting the encoded plurality of channel configuration information to the CM.

According to another aspect of the present invention, there is provided a method of setting an RCS of a CM in a cable network, the method including: transmitting an RCP with respect to a downstream physical layer to a CMTS; receiving a plurality of channel configuration information being composed with reference to the RCP and being required for setting the RCS; and setting the RCS using the plurality of channel configuration information.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 4 illustrates Receive Channel Profile (RCP) reporting control Type Length Value (TLV) encoding in the MDD message of FIG. 3;

FIG. 5 illustrates a table for managing an RCP and Receive Channel Configuration (RCC) information according to an exemplary embodiment of the present invention;

FIG. 8 is a flowchart illustrating an operation process of a CM for changing an RCS of the CM according to an exemplary embodiment of the present invention.

DETAILED DESCRIPTION OF EXEMPLARY EMBODIMENTS

Figure 1:
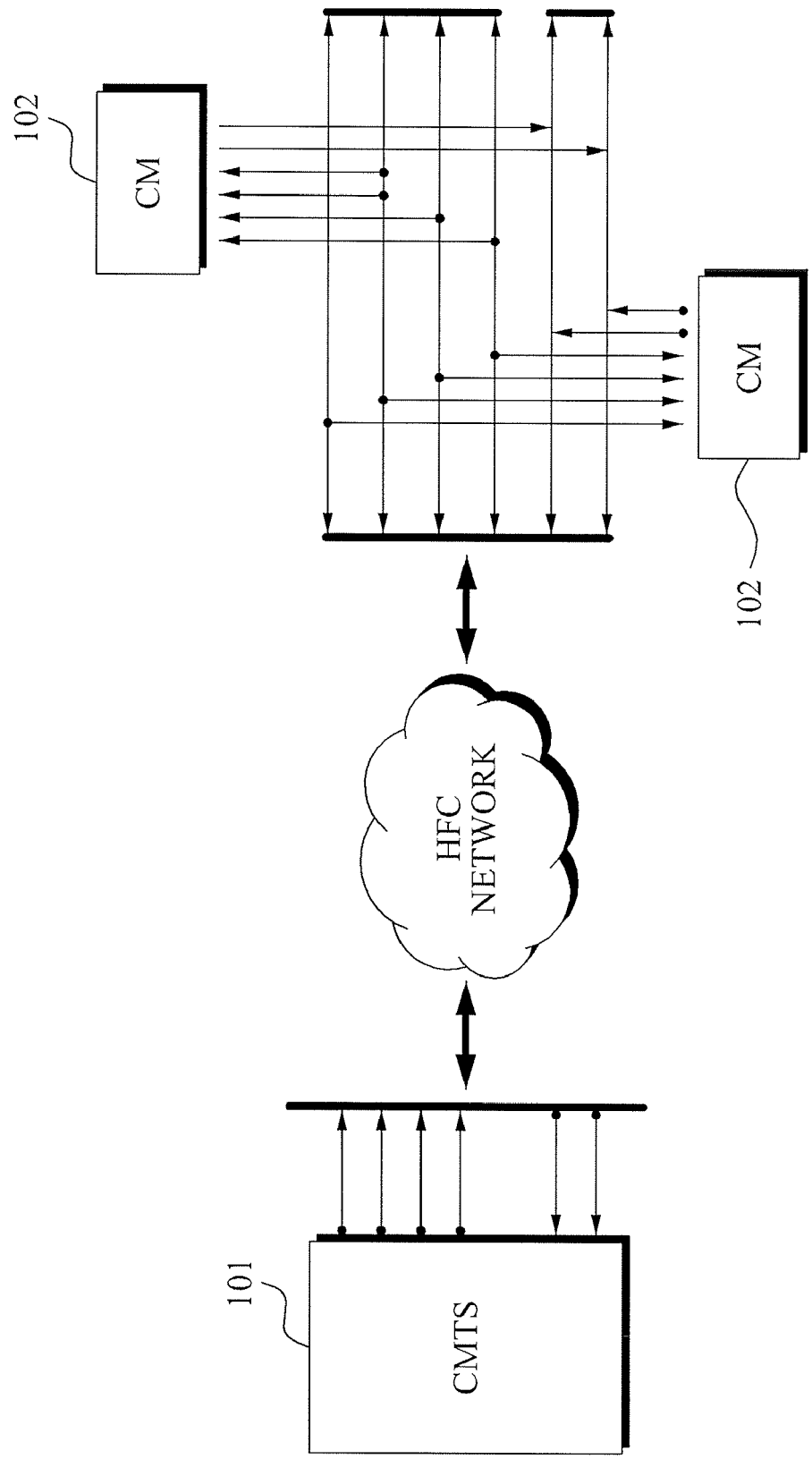
FIG. 1 illustrates a connection structure of a Cable Modem Termination System (CMTS) and cable modems (CMs) to transmit data using a plurality of transmitting/receiving channels according to a conventional art.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Hereinafter, a method of setting and changing a Receive Channel Set (RCS) of a cable modem (CM) in a cable network according to an exemplary embodiment of the present invention is described in detail with reference to the accompanying drawings.

According to a basic principle of the present invention, a Cable Modem Termination System (CMTS) in the cable network using a channel bonding scheme systematically reconstructs and manages a Receive Channel Profile (RCP) of the CM, encodes a plurality of Receive Channel Configurations (RCCs) based on a priority, and transmits the encoded plurality of RCCs to the CM when setting and changing the RCS, thereby effectively restoring a channel even when an error occurs during a process of setting and changing the RCS of the CM.

Figure 2:
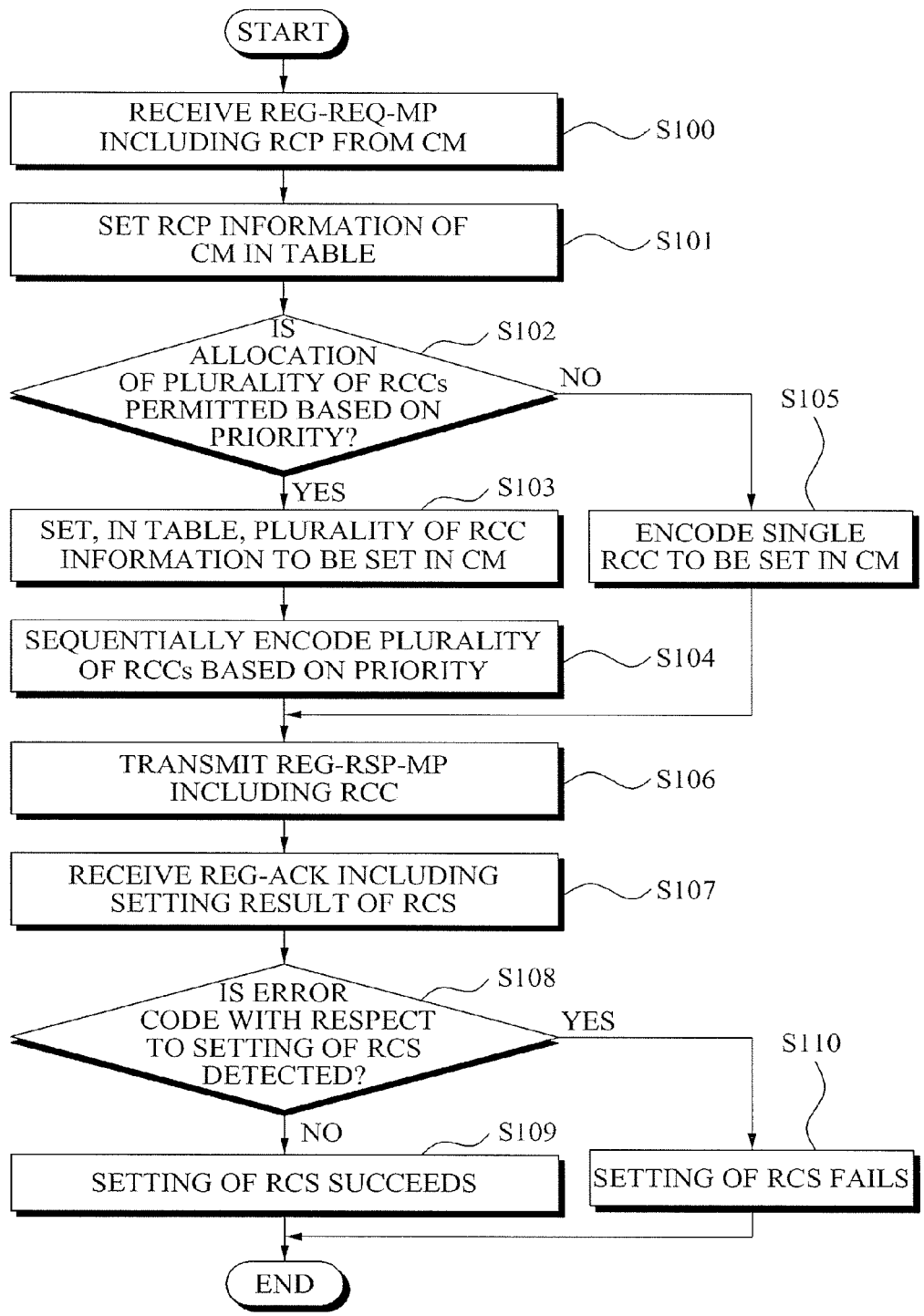
FIG. 2 is a flowchart illustrating an operation process of a CMTS for setting a Receive Channel Set (RCS) of a CM according to an exemplary embodiment of the present invention.

FIG. 2 is a flowchart illustrating an operation process of a CMTS for setting an RCS of a CM according to an exemplary embodiment of the present invention.

Referring to FIG. 2, the CMTS first receives a registration request message of the CM in operation S100.

The CMTS receives the registration request message (REG-REQ-MP) including an RCP of the CM. The RCP relates to performance with respect to a plurality of receiving channels supported by the CM, and logically expresses channel information about a downstream (DS) physical layer of the CM.

In operation S101, the CMTS collects the RCP from the received message and arranges the RCP in a table, in order to allocate an RCC corresponding to the RCP appropriate for each CM when setting and changing the RCS.

In operation S102, the CMTS verifies whether allocation of a plurality of RCCs is permitted based on a priority.

In initial setting, the CMTS may randomly set whether the allocation of the plurality of RCCs is permitted based on the priority.

In operation S103, when the CMTS permits the allocation of the plurality of RCCs based on the priority, the CMTS sets the RCC supported by the CM, and sets RCC information including an allocated RCP-Identification (ID) in the table. The RCC information may be added to the table of the RCP and may be set. The table in which the RCP and the RCC information are set is described in detail below with reference to FIG. 5. In operation S104, the CMTS sequentially encodes the plurality of RCCs based on the priority. Here, the plurality of RCCs includes the RCC to be subsequently attempted when setting of the RCS fails using the RCC to be initially allocated to the CM and the RCC allocated to the CM.

In operation S105, when the CMTS prohibits the allocation of the plurality of RCCs based on the priority, the CMTS encodes the single RCC to be set in the CM.

Whether the CMTS allocates the plurality of RCCs based on the priority may be reported to the CM using an entire channel information message, that is, a Media Access Control (MAC) Domain Descriptor (MDD). The CMTS may periodically transmit an MDD message including information concerning whether the plurality of RCCs is allocated. For example, the CMTS may transmit the MDD message per two seconds. Accordingly, the CM may be aware whether the plurality of RCCs is allocated, using the periodically-received MDD message.

In operation S106, the CMTS subsequently transmits a registration response message (REG-RSP-MP) to the CM.

When the CMTS permits the allocation of the plurality of RCCs, the CMTS transmits, to the CM, the registration response message (REG-RSP-MP) including the plurality of RCCs being sequentially encoded based on the priority.

When the CMTS prohibits the allocation of the plurality of RCCs based on the priority, the CMTS transmits, to the CM, the registration response message (REG-RSP-MP) including the plurality of RCCs sequentially encoded based on the priority in operation S105.

When the CMTS prohibits allocation of the plurality of RCCs based on the priority, the CMTS transmits the registration response message (REG-RSP-MP) including the encoded single RCC to the CM.

In operation S107, the CMTS subsequently receives a registration acknowledgment message (REG-ACK) from the CM.

The CMTS receives the registration acknowledgment message (REG-ACK) including a setting result of the RCS from the CM, and completes the setting of the RCS. In operations S108, S109, and S110, when an error code being the setting result of the RCS is not detected from the registration acknowledgment message (REG-ACK), the setting of the RCS succeeds, and when the error code is detected, the setting of the RCS fails. The CMTS records whether the setting of the RCS succeeds or fails, in the CMTS.

Figure 3:
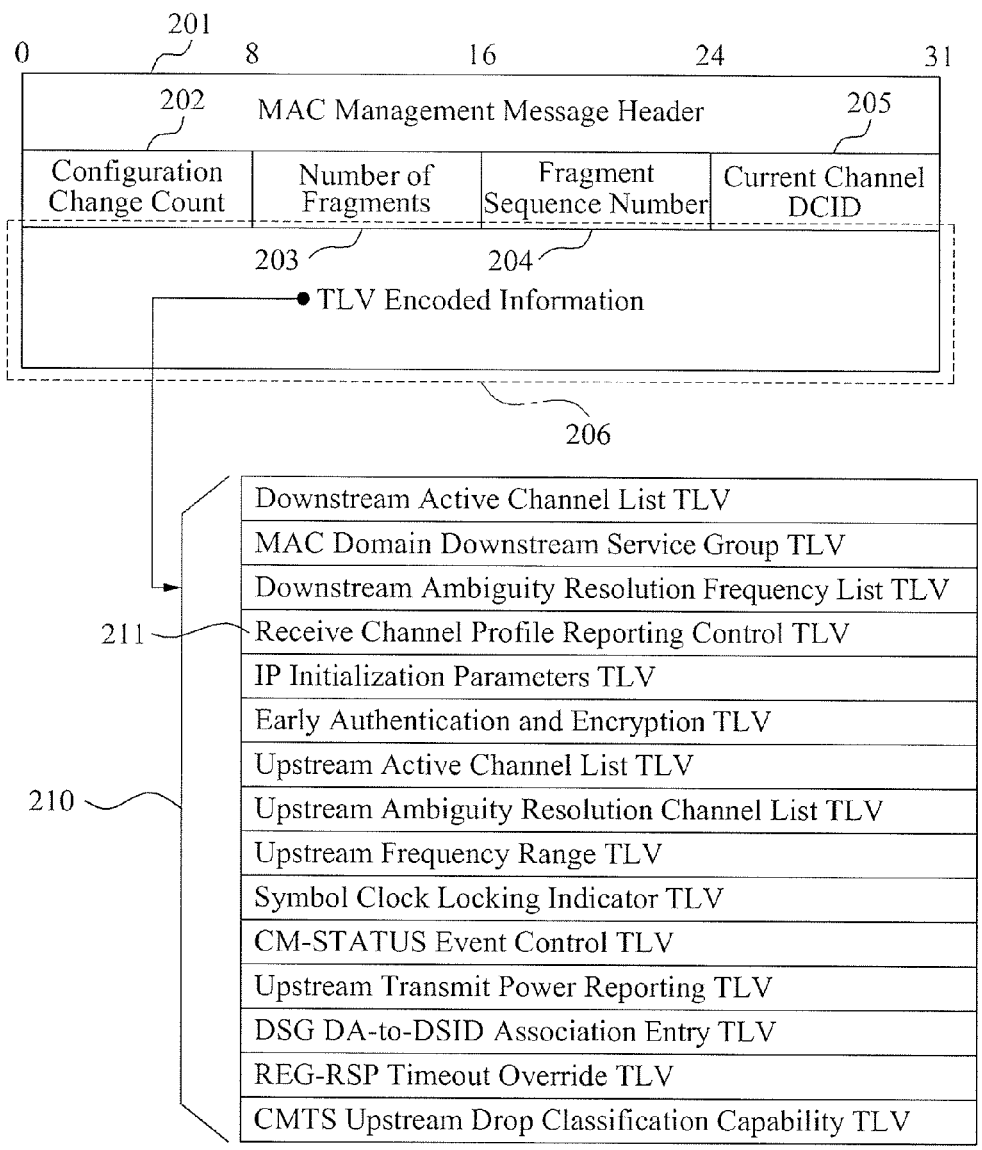
FIG. 3 illustrates a format of a Media Access Control (MAC) Domain Descriptor (MDD) message according to an exemplary embodiment of the present invention.

FIG. 3 illustrates a format of an MDD message used by a CMTS for reporting, to a CM, whether setting of a priority channel set is permitted according to an exemplary embodiment of the present invention.

The CMTS determines whether allocation of a plurality of RCCs to the CM supporting a plurality of transmitting/receiving channels is permitted based on a priority. The CMTS subsequently reports, to the CM, whether the allocation of the plurality of RCCs is permitted based on the priority, using the MDD message.

Referring to FIG. 3, the MDD message includes a MAC manage message Header 201, Configuration Change Count (CCC) 202 to denote whether a message is changed, a number of fragments 203, a fragment sequence number 204, DS Channel Identification (DCID) 205 to which the MDD message is transmitted, and an encoded Type Length Value (TLV) 206. The encoded TLV 206 corresponds to information of receiving channels and includes TLVs illustrated in a table 210 of FIG. 3. The CMTS indicates whether the allocation of the plurality of RCCs is permitted based on the priority, in an RCP reporting control TLV 211 of the several TLVs.

FIG. 4 illustrates RCP reporting control TLV encoding in the MDD message of FIG. 3

Referring to FIG. 4, an RCP reporting control TLV of type 4 includes information concerning whether a 6 MHz mode operates or an 8 MHz mode operates as a Receive Channel (RC) frequency band (Type 4.1) and information concerning whether the CM specifically encodes and reports a profile when the CM reports the RCP, or whether the CM reports only an ID (Type 4.2). Subtype 3 is added to an existing TLV for the above-described purpose, and indicates whether the CMTS allocates a plurality of RCP-IDs in an RCC. When a value of subtype 3 corresponds to 0, the CMTS may operate as a mode of not allocating the plurality of RCP-IDs, and when the value corresponds to 1, the CMTS may allocate the plurality of RCP-IDs and the CM may attempt RC setting using an RCC of a priority.

FIG. 5 illustrates a table for managing an RCP and RCC information according to an exemplary embodiment of the present invention.

Referring to FIG. 5, when a CMTS receives the RCP from a CM, the CMTS composes and stores corresponding information for each CM in the table based on an RCP-ID supported by each CM. The RCP includes RCP-ID 401, RCP-Name 402, a channel frequency band 403 of the corresponding RCP, Receive Module (RM) information 404, RC information 405, and other vendor information 406. RM information 404 denotes RCs included in an RM based on an RM index, a channel range, and other physical connection structures 407, and RC[낼길정1] may include a connectivity with the RM and offset information. RC information 405 includes an RC connectivity, a channel connection offset, and information concerning whether a primary DS channel indicator exists 408, based on an RC index.

The CMTS adds and stores RCC information with reference to the RCP received from the CM. The RCC information includes RCP-ID 409 to be allocated by the CMTS, priority information 410 to be appointed by the CMTS with respect to RCP-ID 409 to be allocated, RM information of RCC 411, RC information of RCC 412, and the like. RM information of RCC 411 includes information about a first channel frequency allocated in the RM and an RM connectivity, and RC information of RCC 412 includes an RC connectivity, an allocated RC frequency, and information concerning whether a primary DS channel indicator exists.

The CMTS stores and manages the RCP and the RCC information of the CM in the above-described table, thereby being useful when change of the RCS is required during initialization setting or an operation of the CM.

Figure 6:
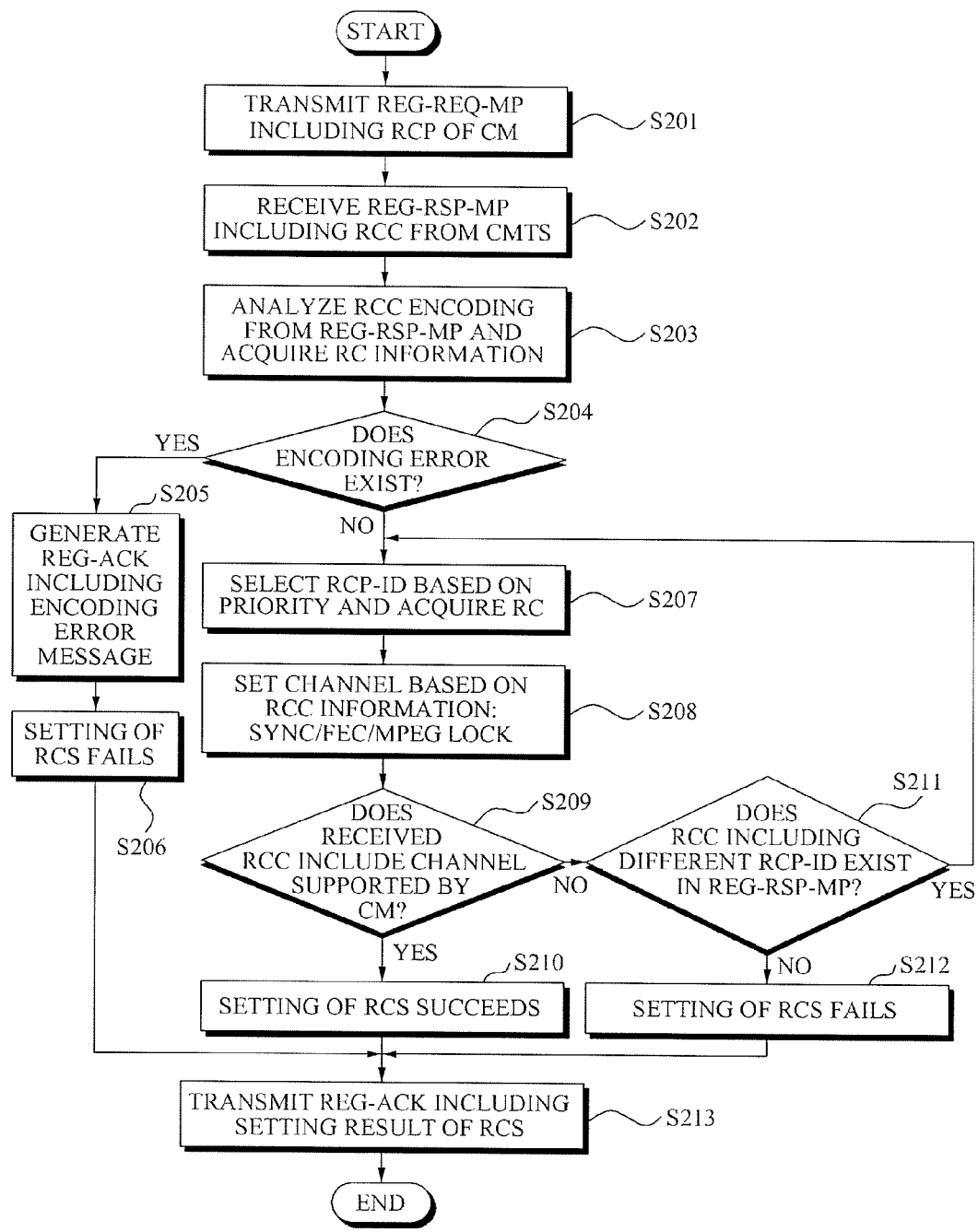
FIG. 6 is a flowchart illustrating an operation process of a CM for setting an RCS of the CM according to an exemplary embodiment of the present invention.

FIG. 6 is a flowchart illustrating an operation process of a CM for setting an RCS of the CM according to an exemplary embodiment of the present invention.

Referring to FIG. 6, the CM first transmits a registration request message (REG-REQ-MP) to the CMTS in operation S201.

The CM transmits the registration request message including an RCP to the CMTS when setting initialization, thereby reporting, to the CMTS, performance with respect to a plurality of receiving channels supported by the CM.

In operation S202, the CM receives a registration response message (REG-RSP-MP) from the CMTS.

The CM receives, from the CMTS, the registration response message (REG-RSP-MP) in response to the registration request message (REG-REQ-MP). In operation S203, the CM detects and analyzes an RCC from the received message, and acquires information required for setting the RCS of the CM.

In operation S204, the CM verifies whether an encoding error exists in the received message.

In operations S205 and S206, when the encoding error exists in the received message, the CM generates a registration acknowledgment message (REG-ACK) including an encoding error message, and records, in the CM, a result that the setting of the RCS fails.

In operation S207, when the encoding error does not exist in the received message, the CM selects an RCP-ID based on a priority being set in RCC encoding and starts RC acquisition.

In operation S208, the CM scans a corresponding channel frequency based on RCC information, and acquires a DS channel using synchronization (SYNC) locking, Forward Error Correction (FEC) frame synchronization acquisition, and Motion Picture Experts Group (MPEG) locking during an RC acquisition process. When the DS channel is successfully acquired with respect to all channels of the RCS as being set in the RCC, the CM may verify that the received RCC includes a channel supported by the CM in operation S209. Accordingly, the CM determines that the setting of the RCS succeeds, and records, in the CM, a result that the setting of the RCS succeeds in operation S210.

When even a single channel fails during the RC acquisition process or when a channel not being supported by the CM exists, the CM inspects a different allocated RCP-ID from the registration response message (REG-RSP-MP) in operation S211. When the different allocated RCP-ID exists, the CM reattempts a process of selecting an RCP-ID of a subsequent priority and acquiring the RC. When the different allocated RCP-ID does not exist, the CM records a result that the setting of the RCS fails in operation S212.

Recording a failure and success result with respect to the setting of the RCS in the CM is for effectively processing an error when the error occurs, or is for reporting the error to a user.

In operation S213, the CM subsequently transmits the registration acknowledgment message (REG-ACK) to the CMTS.

The CM transmits, to the CMTS, the failure and success result with respect to the setting of the RCS, that is, the registration acknowledgment message including an error code when the setting of the RCS fails, thereby completing setting of the RCS.

Figure 7:
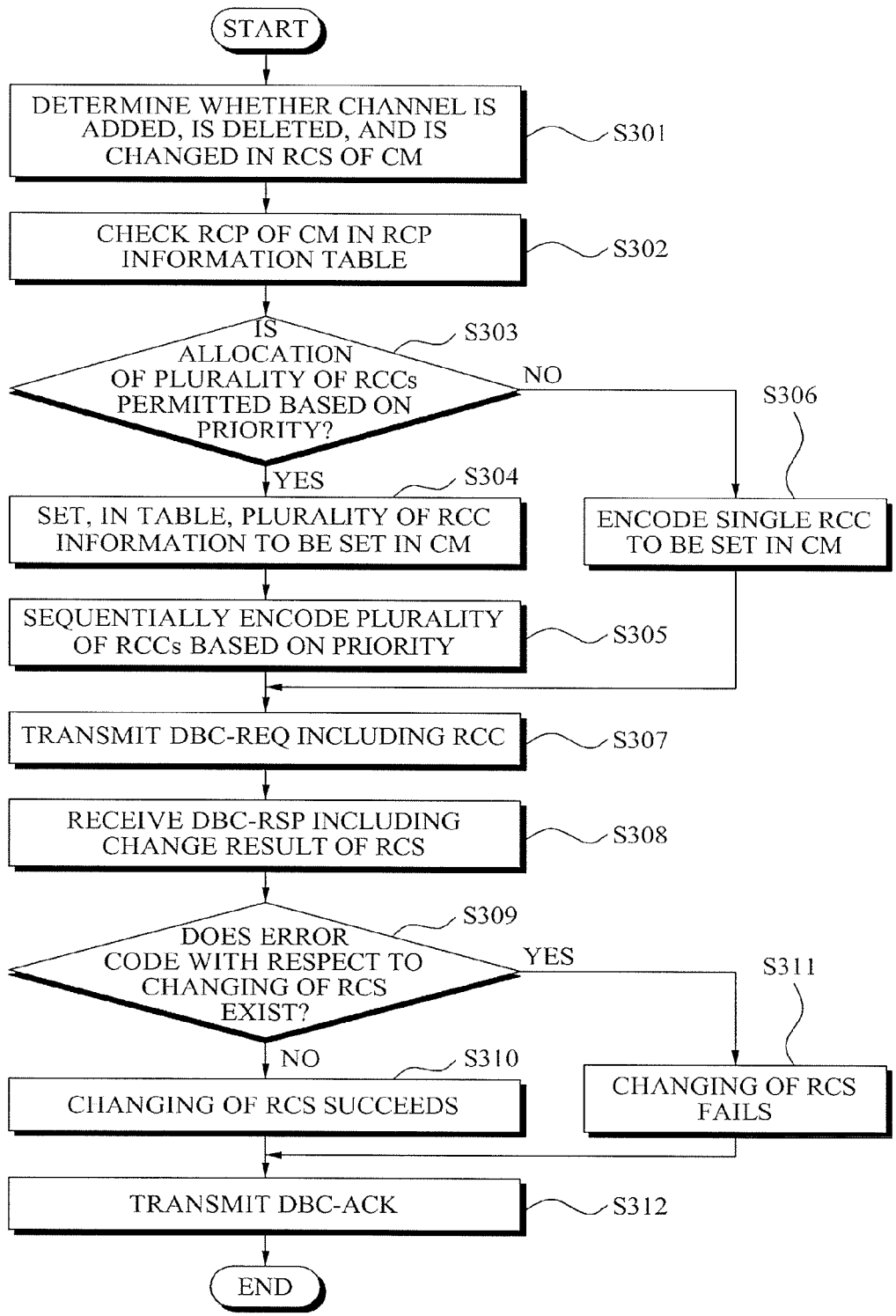
FIG. 7 is a flowchart illustrating an operation process of a CMTS for changing an RCS of a CM according to an exemplary embodiment of the present invention.

FIG. 7 is a flowchart illustrating an operation process of a CMTS for changing an RCS of a CM according to an exemplary embodiment of the present invention.

Referring to FIG. 7, the CMTS determines whether a channel is added, is deleted, or is changed in the RCS of the CM in operation S301.

The CMTS determines whether the channel is added, is deleted, or is changed in the legacy RCS of the CM operating using a plurality of transmitting/receiving channels. In operation S302, the CMTS subsequently checks an RCP of the CM to be changed with reference to a table of an RCP and RCC information.

In operation S303, the CMTS determines whether allocation of a plurality of RCCs is permitted based on a priority.

When the CMTS permits the allocation of the plurality of RCCs based on the priority, the CMTS compares the RCS to be changed and the RCP supported by the CM, and sets an RCC. In operations S304 and S305, the CMTS stores the set RCC information in the table for managing the RCC information, and sequentially encodes the plurality of RCCs based on the priority In operation S306, when the CMTS prohibits the allocation of the plurality of RCCs based on the priority, the CMTS encodes the single RCC to be set based on the RCS to be changed in the CM.

In operation S307, the CMTS subsequently transmits a dynamic bonding change request message (DBC-REQ) to the CM.

When the CMTS permits the allocation of the plurality of RCCs, the CMTS transmits, to the CM, the dynamic bonding change request message (DBC-REQ) including the plurality of RCCs being sequentially encoded based on the priority.

When the CMTS prohibits the allocation of the plurality of RCCs, the CMTS transmits, to the CM, the dynamic bonding change request message (DBC-REQ) including the single encoded RCC.

In operation S308, the CMTS receives a dynamic bonding change response message (DBC-RSP) from the CM.

The CMTS receives, from the CM, the dynamic bonding change response message (DBC-RSP) including a change result of the RCS. In operations S309, S310, and S311, the CMTS determines, from the dynamic bonding change response message (DBC-RSP), whether an error code related to the changing of the corresponding RCS exists, and records, in the CMTS, whether the changing of the RCS succeeds or fails.

In operation S312, the CMTS subsequently transmits a dynamic bonding change acknowledgment message (DBC-ACK) to the CM.

The CMTS indicates, in the dynamic bonding change acknowledgment message (DBC-ACK), whether the changing of the RCS succeeds or fails, and transmits the dynamic bonding change acknowledgment message (DBC-ACK) to the CM.

FIG. 8 is a flowchart illustrating an operation process of a CM for changing an RCS of the CM according to an exemplary embodiment of the present invention.

Referring to FIG. 8, the CM first receives a dynamic bonding change request message (DBC-REQ) from a CMTS in operation S401.

In operation S402, the CM receives the dynamic bonding change request message (DBC-REQ) for channel addition/deletion/change of the RCS, detects and analyzes an RCC from the received dynamic bonding change request message (DBC-REQ), and acquires information required for changing the RCS of the CM.

In operation S403, the CM subsequently verifies whether an encoding error exists in the received message.

In operations S404 and S405, when the encoding error exists in the received message, the CM generates a dynamic bonding change response message (DBC-RSP) including an encoding error message, and records, in the CM, a result that the changing of the RCS fails.

In operation S406, when the encoding error does not exist in the received message, the CM selects an RCP-ID based on a priority set in RCC encoding and starts RC acquisition.

In operation S407, the CM scans a corresponding channel frequency based on RCC information, and acquires a DS channel using SYNC locking, FEC frame synchronization acquisition, and MPEG locking during an RC acquisition process. When the DS channel is successfully acquired with respect to all channels of the RCS as being set in the RCC, the CM may verify that the received RCC includes a channel supported by the CM in operation S408. Accordingly, the CM determines that the changing of the RCS succeeds, and records, in the CM, a result that the changing of the RCS succeeds in operation S409.

When even a single channel fails or when a channel not being supported by the CM exists, the CM inspects a different allocated RCP-ID from the dynamic bonding change response message (DBC-RSP) in operation S410. When the different allocated RCP-ID exists, the CM reattempts a process of selecting an RCP-ID of a subsequent priority and acquiring the RC. When the different allocated RCP-ID does not exist, the CM records a result that the changing of the RCS fails in operation S411.

In operation S412, the CM subsequently transmits the dynamic bonding change response message (DBC-RSP) to the CMTS.

The CM transmits, to the CMTS, the failure and success result with respect to the changing of the RCS, that is, the dynamic bonding change response message (DBC-RSP) including an error code when the changing of the RCS fails.

In operation S413, the CM subsequently receives a dynamic bonding change acknowledgment message (DBC-ACK) from the CMTS.

The CM subsequently receives the dynamic bonding change acknowledgment message (DBC-ACK) from the CMTS, thereby completing the changing of the RCS.

The method of setting and changing the RCS of the CM according to the above-described exemplary embodiments may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, there is provided a method of setting and changing an RCS of a CM in a cable network which enables a CMTS to systematically reconstruct and manage an RCP of the CM, to encode a plurality of RCS configuration information based on a priority when setting and changing the RCS, and to transmit the encoded plurality of RCS configuration information to the CM, thereby effectively setting and changing the RCS even when an error occurs during a process of setting and changing the RCS of the CM. Therefore, the CMTS and the CM may smoothly transmit/receive the data.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of setting a Receive Channel Set (RCS) of a Cable Modem Termination System (CMTS), the method comprising:
   receiving a Receive Channel Profile (RCP) with respect to a downstream physical layer of a cable modem (CM);
   composing a plurality of Receive Channel Configurations (RCCs) required for setting the RCS of the CM with reference to the RCP, the plurality of RCCs including at least an RCC for initial setting of the RCS and an RCC for a subsequent setting of the RCS in the event that the initial setting fails; and
   encoding the plurality of RCCs, and transmitting the encoded plurality of RCCs to the CM in a registration response transmitted after each of the plurality of RCCs are composed, wherein the encoded plurality of RCCs including the RCC for initial setting of the RCS and the RCC for the subsequent setting of the RCS in the event that the initial setting fails is sent in the registration response before receiving a Registration Acknowledge from the CM.

2. The method of claim 1, wherein the encoded plurality of RCCs include priority information used for setting the RCS.

3. The method of claim 1, wherein the RCP and the plurality of RCCs are stored in a table.

4. The method of claim 1, further comprising transmitting a Media Access Control Domain Descriptor including a RCP reporting control Type Length Value (TLV) indicating whether the allocation of the plurality of RCCs is permitted.

5. The method of claim 1, wherein encoding the plurality of RCCs includes sequentially encoding the plurality of RCCs based on priority of use for setting the RCS.

6. A method of setting a Receive Channel Set (RCS) of a cable modem (CM), the method comprising:
   transmitting a Receive Channel Profile (RCP) with respect to a downstream physical layer to a Cable Modem Termination System (CMTS);
   receiving a plurality of Receive Channel Configurations (RCCs) being composed with reference to the RCP, being required for setting the RCS, and including at least an RCC for initial setting of the RCS and an RCC for subsequent setting of the RCS in the event that the initial setting fails, wherein the plurality of RCCs including at least the RCC for initial setting of the RCS and the RCC for subsequent setting of the RCS are received before sending a Registration Acknowledgement or a change response to the CMTS; and
   after receiving the plurality of RCCs including the RCC for initial setting of the RCS and the RCC for subsequent setting of the RCS, setting the RCS using the plurality of RCCs, wherein the setting the RCS includes attempting an initial setting of the RCS using the RCC for initial setting of the RCS, and when the initial setting of the RCS fails, attempting another setting of the RCS using the RCC for subsequent setting of the RCS.

7. The method of claim 6, wherein the setting sets the RCS using an RCC of the plurality of RCCs including a top priority, and sets the RCS using an RCC of the plurality of RCCs including a subsequent priority when the setting of the RCS fails.

8. A method of changing a Receive Channel Set (RCS) of a Cable Modem Termination System (CMTS), the method comprising:
   determining whether a predetermined RCS of a cable modem (CM) is changed;
   composing a plurality of Receive Channel Configurations (RCCs) required for changing the RCS with reference to an RCP with respect to a downstream physical layer of the CM, the plurality of RCCs including at least an RCC for initial setting of the RCS and an RCC for a subsequent setting of the RCS in the event that the initial setting fails; and
   encoding the plurality of RCCs based on a priority, and transmitting the encoded plurality of RCCs to the CM in a change request transmitted after each of the plurality of RCCs are composed, wherein the encoded plurality of RCCs including the RCC for initial setting of the RCS and the RCC for the subsequent setting of the RCS in the event that the initial setting fails is sent in the change request before receiving a change response from the CM.

9. The method of claim 8, wherein the RCP corresponds to information stored in a table of the CMTS.

* * * * *